(12) United States Patent
Fujii

(10) Patent No.: US 7,519,446 B2
(45) Date of Patent: Apr. 14, 2009

(54) MANUFACTURE CONDITION SETTING SYSTEM, MANUFACTURE CONDITION SETTING METHOD, CONTROL PROGRAM, AND COMPUTER-READABLE RECORD MEDIUM RECORDING CONTROL PROGRAM THEREIN

(75) Inventor: Toru Fujii, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 191 days.

(21) Appl. No.: 11/405,699

(22) Filed: Apr. 18, 2006

(65) Prior Publication Data

US 2006/0259176 A1 Nov. 16, 2006

(30) Foreign Application Priority Data

Apr. 20, 2005 (JP) ............................ P2005-122884

(51) Int. Cl.
*G06F 19/00* (2006.01)
(52) U.S. Cl. ....................................... 700/108; 700/104
(58) Field of Classification Search ................. 700/108, 700/103–105, 174
See application file for complete search history.

(56) References Cited

U.S. PATENT DOCUMENTS 5,643,478 A * 7/1997 Dillet et al. ............ 219/130.21
5,886,896 A * 3/1999 Lantz et al. .................. 700/116
5,984,506 A * 11/1999 Robbiani et al. ............ 700/162

FOREIGN PATENT DOCUMENTS

| EP | 1 296 211 | 3/2003 |
|---|---|---|
| JP | 05-269646 | 10/1993 |
| JP | 06-330164 | 11/1994 |
| JP | 10-187206 | 7/1998 |
| JP | 10-193240 | * 7/1998 |
| JP | 2000-263110 | 9/2000 |
| WO | WO 02/03156 | 1/2002 |

* cited by examiner

*Primary Examiner*—Albert DeCady
*Assistant Examiner*—Steven R Garland
(74) *Attorney, Agent, or Firm*—Foley & Lardner LLP

(57) ABSTRACT

A manufacture condition setting system includes a manufacture state acquisition unit to which static/dynamic conditions and a product quality in the case where the static/dynamic conditions do not change for, at least, a predetermined number of manufactured articles in an ordinary manufacture state are inputted together with reference information, a dynamic condition inference unit which estimates and outputs a corresponding optimal dynamic condition in a case where a combination of the static conditions is an experienced one, and a dynamic condition correction unit which, if necessary, corrects inference knowledge stored by the dynamic condition inference unit, by using information inputted from the manufacture state acquisition unit.

5 Claims, 7 Drawing Sheets

FIG. 2

[EXPERIENCE]

| CATEGORY | ITEM | ATTRIBUTE | EXPERIENCE | | | |
|---|---|---|---|---|---|---|
| STATIC CONDITION (41) | PRODUCT MODEL | QUALITATIVE VARIABLE | TYPE B | TYPE B | TYPE A | ... → $X_i$ |
| | MOLDING DIE (PART A) | QUALITATIVE VARIABLE | #2 | #2 | #1 | ... → $Y_j$ |
| | MEAN THICKNESS (PART B) | INSTALLATION A | 23mm | 23mm | 18mm | ... → $Z_k$ |
| DYNAMIC CONDITION (42) | BENDING MAGNITUDE | INSTALLATION B | 3.3mm | 3.0mm | 2.5mm | ... → $M_{ijk}$ |
| | TEMPERATURE | — | 142°C | 140°C | 135°C | ... → $N_{ijk}$ |
| PRODUCT QUALITY (43) | DEFECT PERCENTAGE | — | 7% | 5% | 4% | ... → $E_{ijk}$ |
| REFERENCE INFORMATION (44) | START TIME | — | 2005/4/7 8:40 | 2005/4/7 10:55 | 2005/4/7 19:21 | ... |
| | END TIME | — | 2005/4/7 10:30 | 2005/4/7 16:43 | 2005/4/7 03:02 | ... |
| | NUMBER OF MANUFACTURED ARTICLES | — | 1080 | 3043 | 4251 | ... |

(r1 indicates the middle experience column; r2 indicates the rightmost experience column)

FIG. 3

[KNOWLEDGE]

| CATEGORY | ITEM | ATTRIBUTE | KNOWLEDGE r1 | KNOWLEDGE r2 | ... |
|---|---|---|---|---|---|
| STATIC CONDITION | PRODUCT MODEL | QUALITATIVE VARIABLE | TYPE B | TYPE B | ... → Xi |
| | MOLDING DIE (PART A) | QUALITATIVE VARIABLE | #2 | #1 | ... → Yj |
| | MEAN THICKNESS (PART B) | INSTALLATION A | 23mm | 18mm | ... → Zk |
| DYNAMIC CONDITION | BENDING MAGNITUDE | INSTALLATION B | 3.3mm | 2.5mm | ... → Mijk |
| | TEMPERATURE | — | 140°C | 135°C | ... → Nijk |
| PRODUCT QUALITY | DEFECT PERCENTAGE | — | 5% | 4% | ... → Eijk |
| REFERENCE INFORMATION | START TIME | — | 2005/4/7 10:55 | 2005/4/7 19:21 | ... |
| | END TIME | — | 2005/4/7 16:43 | 2005/4/7 03:02 | ... |
| | NUMBER OF MANUFACTURED ARTICLES | — | 3043 | 4251 | ... |

Brackets: 41 (STATIC CONDITION), 42 (DYNAMIC CONDITION), 43 (PRODUCT QUALITY), 44 (REFERENCE INFORMATION)

FIG. 6

[QUANTITATIVE VARIABLE]

▨ EXPERIENCED   ◯ OBJECT TO BE ANALOGIZED

MOLDING DIE: #2 ($M_{i2k}$, $N_{i2K}$, $E_{i2K}$)

| ITEM | A | B | C | D | E |
|---|---|---|---|---|---|
| AT LEAST 25 mm | ▨ | ▨ | | | |
| 23 ~ 24 mm | ▨ | α1 | | ▨ | |
| 21 ~ 22 mm | | | | ▨ | |
| AT MOST 20 mm | α2 | ▨ | ▨ | ▨ | |

$Z_k$ ← (rows)   $X_i$ → (columns)

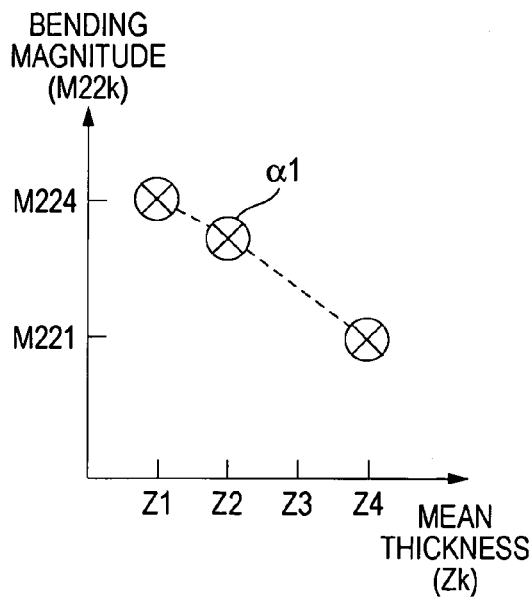

FIG. 7A

[QUANTITATIVE VARIABLE]
PRODUCT MODEL: TYPE B ($X_2$)

BENDING MAGNITUDE ($M_{22k}$) vs MEAN THICKNESS ($Z_k$)

$$M_{223} = \frac{2M_{224} + M_{221}}{3}$$

PROPORTIONALLY ALLOCATE VALUES OF BOTH NEAREST SIDES

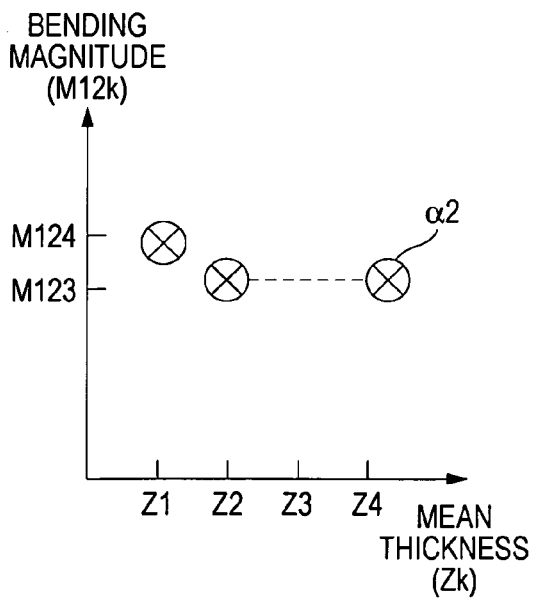

FIG. 7B

[QUANTITATIVE VARIABLE]
PRODUCT MODEL: TYPE A ($X_1$)

BENDING MAGNITUDE ($M_{12k}$) vs MEAN THICKNESS ($Z_k$)

$$M_{121} = M_{123}$$

DIRECTLY USE VALUE OF ONE NEAREST SIDE

FIG. 8

[QUALITATIVE VARIABLE]

▨ EXPERIENCED    ◯ OBJECT TO BE ANALOGIZED

MEAN THICKNESS: AT MOST 20 mm ($M_{ij1}$, $N_{ij1}$, $E_{ij1}$)

| ITEM | A | B | C | D | E | → $X_i$ |
|---|---|---|---|---|---|---|
| #3 | $\beta_1$ | ▨ |  |  | ▨ | |
| #2 |  |  | ▨ |  | $\beta_2$ | |
| #1 |  | ▨ |  | ▨ |  | |

[QUALITATIVE VARIABLE]

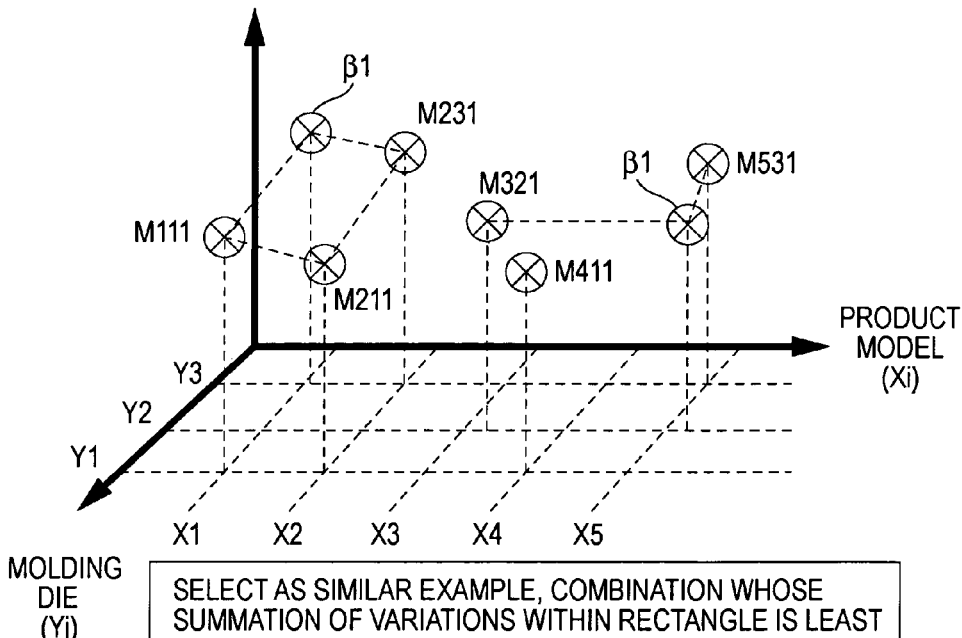

SELECT AS SIMILAR EXAMPLE, COMBINATION WHOSE SUMMATION OF VARIATIONS WITHIN RECTANGLE IS LEAST $$\Delta M_{131} = |M_{111} - M_{211}| + |M_{211} - M_{231}|$$

ESTIMATE OFFSET ASSUMING THAT GRADIENTS OF OPPOSITE SIDE WITHIN RECTANGLE ARE EQUAL $$M_{131} = M_{111} - M_{211} + M_{231}$$

CALCULATE ARITHMETIC MEAN OF SIMILAR EXAMPLES WHEN RECTANGLE IS NONEXISTENT $$M_{521} = \frac{M_{321} + M_{531}}{2}$$

MANUFACTURE CONDITION SETTING SYSTEM, MANUFACTURE CONDITION SETTING METHOD, CONTROL PROGRAM, AND COMPUTER-READABLE RECORD MEDIUM RECORDING CONTROL PROGRAM THEREIN

CROSS REFERENCE TO RELATED PATENT APPLICATIONS

Japanese Priority Application 122,884/2005, filed Apr. 20, 2005, including the specification, drawings, claims, and abstract, is incorporated herein by reference in its entirety.

BACKGROUND OF THE INVENTION

1. Field of the Invention

The present invention relates to a manufacture condition setting system which estimates a dynamic condition such as the set value of a manufacturing equipment, a manufacture condition setting method, a control program, and a computer-readable record medium recording a control program therein.

2. Description of the Related Art

For enhancing a product quality and a production efficiency, it is important to optimize dynamic conditions such as the set values of manufacturing equipments, from the beginning of the point of time of the alterations of static conditions such as a product model and a part characteristic.

Manufacture condition setting apparatuses in the prior art are as indicated below.

Patent Document 1 (Japanese Patent No. 3,195,637 registered on Jun. 1, 2001) discloses in an expert system for holding the empirical laws of manufacture conditions (material specifications, working conditions, etc.) and product specifications, a technique which selects materials suited to the product specifications, which determines the working conditions from the materials and the product specifications, and which adjusts and learns the working conditions in accordance with a small quantity of pre-production prototype or with the result of a sampling inspection.

Patent Document 2 (JP-A-2000-263110 laid open on Sep. 26, 2000) discloses in the continuous rolling control of a steel plate or the like, a technique which checks the degree of experience of a lot that is classified depending upon the kind of steel, the thickness of the plate, the width of the plate, etc., and which, when the degree of experience is low, amends a control method by using the learnt result of a lot of close sort as is highly experienced.

Patent Document 3 (JP-A-6-330164 laid open on Nov. 29, 1994) discloses in a hot-worked steel material, a technique which predicts the structure of a steel material after cooling, by using a transformation prediction model in accordance with components and heating/working conditions.

Patent Document 4 (JP-A-10-187206 laid open on Jul. 14, 1998) discloses a technique which holds the offset magnitudes between actual result values and values predicted from mathematical models (exponential smoothing) for respective product groups and respective treatment conditions, and which obtains common correction magnitudes as to temporal fluctuations.

However, the prior-art manufacture condition setting apparatuses as mentioned above have had problems as indicated below.

When the combinations of static conditions are large in number, it becomes difficult to acquire the knowledge items of dynamic conditions for all the combinations of static conditions, and hence, the number of man-hour for building a system and starting a service increases.

Knowledge once built in a system stores only the intensified results of past experiences. Therefore, even in a case where any of the past experiences is to be deleted on account of a drawback found later, the knowledge cannot be corrected.

Even if a dynamic condition for the inexperienced combination of static conditions is estimated by proportional allocations or from a prediction expression, the estimation is sometimes impossible in the existence of the static condition of a qualitative variable, because the sequence relation of the static condition is not uniquely determined.

When the combinations of static conditions are large in number, an enormous number of experiences are required for refining the knowledge items of dynamic conditions for all the combinations of static conditions, and hence, a term for enhancing the reliability of knowledge lengthens.

Even when the knowledge items of optimal dynamic conditions for all the combinations of static conditions have been completely acquired, the causal relations of qualities to the static conditions are not definite. Therefore, although the optimal dynamic conditions can be estimated, the optimal combination of static conditions cannot be searched for.

SUMMARY OF THE INVENTION

The present invention has been made in view of the above problems, and it has for its object to realize a manufacture condition setting system which is easy of building a knowledge base for estimating a dynamic condition such as the set value of a manufacturing equipment and which affords a high estimation precision, a manufacture condition setting method, a control program, and a computer-readable record medium recording a control program therein.

In order to accomplish the object, a manufacture condition setting system according to the invention assists an estimation of a dynamic condition such as a set value of a manufacturing equipment, and includes manufacture state acquisition means for acquiring static conditions that include a plurality of items, and a dynamic condition corresponding to the static conditions; and experience accumulation means for accumulating the static conditions and the dynamic condition in an experience database in association with each other, when the number of manufactured articles manufactured in a state where the static conditions and the dynamic condition are constant is, at least, a predetermined number of manufactured articles, and besides, the static conditions and the dynamic condition do not change for, at least, a predetermined number of manufactured articles.

Also, a manufacture condition setting method according to the invention is provided for a manufacture condition setting system which assists an estimation of a dynamic condition such as a set value of a manufacturing equipment, and includes the steps of allowing manufacture state acquisition means of the manufacture condition setting system to acquire static conditions that include a plurality of items and a dynamic condition corresponding to the static conditions; and allowing experience accumulation means of the manufacture condition setting system to accumulate the static conditions and the dynamic condition in an experience database in association with each other, when the number of manufactured articles manufactured in a state where the static conditions and the dynamic condition are constant is a predetermined number of manufactured articles, and besides, the static conditions and the dynamic condition do not change for, at least, a predetermined number of manufactured articles.

Here, the "static conditions" are conditions which are not altered midway of the manufacture of a lot, such as a product model, a metal mold type and a part characteristic. Further, the "dynamic condition" is a condition which is alterable midway of the manufacture of the lot, such as the set value or alteration magnitude of a manufacturing equipment. Incidentally, the lot that includes a plurality of manufactured articles.

According to the above configuration, when the static conditions and the dynamic condition do not change for the predetermined number of manufactured articles, they are accumulated in the experience database in association with each other.

Accordingly, the dynamic condition corresponding to the static conditions can be acquired in an ordinary manufacture state so as to build the experience database. Therefore, any special operation for building a knowledge database for estimating the manufacture condition setting of the dynamic condition of a new lot is not incurred, and it is permitted to start the service of a manufacture line early.

In addition, a manufacture condition setting system according to the invention further includes knowledge building means for registering static conditions and dynamic conditions from the experience database, in a knowledge database in which one dynamic condition is held in association with one static condition; wherein when a plurality of dynamic conditions of different contents are accumulated in association with static conditions of identical contents, in the experience database, the knowledge building means selects one dynamic condition to be registered in the knowledge database, from the plurality of dynamic conditions, or it generates one dynamic condition to be registered in the knowledge database, on the basis of the plurality of dynamic conditions.

According to the above configuration, the knowledge database in which one dynamic condition is registered for one static condition can be further built from the experience database in which a plurality of dynamic conditions are registered for one static condition. Further, in determining one dynamic condition which is to be made a knowledge item, one dynamic condition may be selected from a plurality of experienced dynamic conditions on the basis of manufacture qualities (such as defect percentages), or it may well be obtained by a calculation such as averaging the plurality of experienced dynamic conditions.

Also, the experience database in which past experiences are accumulated, and the knowledge database which serves to estimate dynamic conditions can be dividedly held, so that the experiences and knowledge items can be easily deleted and altered. Even in a case, for example, where any drawback has been found in a manufacture history later and where any of the experiences is to be deleted, the knowledge database may be rebuilt after updating the experience database, and hence, the degeneration of the building of knowledge does not occur.

In addition, a manufacture condition setting system according to the invention has a feature in that, in accumulating the static conditions and the dynamic condition in the experience database in association with each other, the experience accumulation means accumulates the static conditions and the dynamic condition in the experience database by further associating reference information for retrieving them.

According to the above configuration, the reference information is further affixed to the static conditions and dynamic condition of the experience database, and hence, it is permitted to retrieve the static conditions and dynamic condition. Utilizable as the reference information are, for example, information items such as the dates and hours of the start/end of manufacture and the number of manufactured articles.

Accordingly, even in a case, for example, where any drawback has been found in a manufacture history after the accumulation inn the experience database and where any of the experiences needs to be deleted, the experience can be retrieved using the reference information, and hence, the processing is simple. Incidentally, the use of the reference information is not limited to the deletion of the experience or knowledge.

Besides, a manufacture condition setting system according to the invention assists an estimation of a dynamic condition such as a set value of a manufacturing equipment-, and includes dynamic condition analogy means operating when any dynamic condition associated with a desired static condition to-be-estimated does not exist in a knowledge database in which one dynamic condition is held in association with one static condition, for selecting one item of a quantitative variable included in static conditions, for extracting static conditions as to which settings of all items with one item further excepted from the other items except one selected item are identical to those of the desired static condition, and for generating a dynamic condition corresponding to the desired static condition, on the basis of dynamic conditions associated with the extracted static conditions.

Further, a manufacture condition setting method according to the invention is provided for a manufacture condition setting system which assists an estimation of a dynamic condition such as a set value of a manufacturing equipment, and includes the step of allowing dynamic condition analogy means of the manufacture condition setting system to select one item of a quantitative variable included in static conditions, when any dynamic condition associated with a desired static condition to-be-estimated does not exist in a knowledge database in which one dynamic condition is held in association with one static condition, to extract static conditions as to which settings of all items with one item further excepted from the other items except one selected item are identical to those of the desired static condition, and to generate a dynamic condition corresponding to the desired static condition, on the basis of dynamic conditions associated with the extracted static conditions.

According to the above configuration, in a case where any dynamic condition corresponding to a new static condition (inexperienced static condition) whose dynamic condition is not registered is to be estimated by employing the knowledge database in which one dynamic condition is registered for one static condition, the dynamic condition corresponding to the desired static condition is generated on the basis of the dynamic conditions associated with the similar static conditions. Concretely, one item of the quantitative variable included in the static condition is selected, the static conditions as to which the settings of all the items with one item further excepted from the other items except one selected item are identical to those of the desired static condition are extracted, and the dynamic condition corresponding to the desired static condition is generated on the basis of the dynamic conditions associated with the extracted static conditions.

Besides, the dynamic condition is generated by the procedure as stated above, whereby the dynamic condition can be generated even in a case where a qualitative variable whose sequence relation is not uniquely determined is included in the static condition. Accordingly, the static conditions are freed from restrictions, and it is permitted to estimate the optimal dynamic condition.

Further, a manufacture condition setting system according to the invention assists an estimation of a dynamic condition such as a set value of a manufacturing equipment, and includes static condition correction means operating when contents of a plurality of dynamic conditions associated with a plurality of static conditions in which settings of only one item differ are substantially identical, in a knowledge database in which one dynamic condition is held in association with one static condition, for unifying the plurality of static conditions and dynamic conditions into one static condition and one dynamic condition, and for deleting the pertinent item from the static conditions.

Further, a manufacture condition setting method according to the invention is provided for a manufacture condition setting system which assists an estimation of a dynamic condition such as a set value of a manufacturing equipment, and includes the step of allowing static condition correction means of the manufacture condition setting system to unify a plurality of static conditions and a plurality of dynamic conditions into one static condition and one dynamic condition when contents of the plurality of dynamic conditions associated with the plurality of static conditions in which settings of only one item differ are substantially identical, in a knowledge database in which one dynamic condition is held in association with one static condition, and to delete the pertinent item from the static conditions.

According to the above configuration, that item of the static conditions which do not influence the dynamic conditions is deleted, and the plurality of static conditions as to which the dynamic conditions agree are unified as an identical knowledge item.

Accordingly, the combinations of static conditions can be decreased to refine knowledge. Therefore, the reliability of the knowledge can be enhanced even with a small number of experiences. Especially in a case where the number of the combinations of static conditions is large, it becomes difficult to acquire the knowledge items of dynamic conditions for all the combinations of static conditions. Therefore, to narrow down the items of static conditions as stated above is effective for starting the service of the estimation of a dynamic condition early by the manufacture condition setting system.

Further, a manufacture condition setting system according to the invention assists an estimation of a dynamic condition such as a set value of a manufacturing equipment, and includes static condition correction means operating when a plurality of dynamic conditions of substantially identical contents exist among a plurality of dynamic conditions associated with a plurality of static conditions in which settings of only one item differ, in a knowledge database in which one dynamic condition is held in association with one static condition, for unifying the plurality of dynamic conditions of substantially identical contents and the plurality of static conditions associated with the dynamic conditions, into one dynamic condition and one static condition, and for unifying the settings of the pertinent item of the plurality of static conditions into one setting.

Also, a manufacture condition setting method according to the invention is provided for a manufacture condition setting system which assists an estimation of a dynamic condition such as a set value of a manufacturing equipment, and includes the step of allowing static condition correction means of the manufacture condition setting system to unify a plurality of dynamic conditions of substantially identical contents and a plurality of static conditions associated with the dynamic conditions, into one dynamic condition and one static condition, when the plurality of dynamic conditions of substantially identical contents exist among a plurality of dynamic conditions associated with a plurality of static conditions in which settings of only one item differ, in a knowledge database in which one dynamic condition is held in association with one static condition, and to also unify the settings of the pertinent item of the plurality of static conditions into one setting.

A plurality of set values which can be set as one item of static conditions, sometimes include ones which do not influence dynamic conditions even when they are discriminated from other set values. According to the above configuration, therefore, knowledge items having the set values which are meaningless even when discriminated, as stated above, are unified as an identical knowledge item.

Accordingly, the combinations of static conditions can be decreased to refine knowledge. Therefore, the reliability of the knowledge can be enhanced even with a small number of experiences. Especially in a case where the number of the combinations of static conditions is large, it becomes difficult to acquire the knowledge items of dynamic conditions for all the combinations of static conditions. Therefore, to narrow down the items of static conditions as stated above is effective for starting the service of the estimation of a dynamic condition early by the manufacture condition setting system.

Also, a manufacture condition setting system according to the invention includes condition inference means for reading out conditions and qualities from a database in which conditions including a plurality of items such as set values of a manufacturing equipment are held in association with qualities of manufactured articles manufactured under the conditions in the past, for comparing the read-out conditions, for unifying a plurality of conditions into one and also unifying a plurality of qualities associated with the plurality of conditions, into one, in existence of the plurality of conditions in which settings of alterable items included in the conditions are identical, and for extracting a condition with which the most excellent quality is associated, from among the conditions after the unifications and the conditions which were not identical in the settings of the alterable items to the other conditions.

Also, a manufacture condition setting method according to the invention is provided for a manufacture condition setting system which assists an estimation of a condition such as a set value of a manufacturing equipment, and includes the step of allowing a condition inference means of the manufacture condition setting system to read out conditions and qualities from a database in which conditions including a plurality of items such as set values of a manufacturing equipment are held in association with qualities of manufactured articles manufactured under the conditions in the past, to compare the read-out conditions, to unify a plurality of conditions into one and also unify a plurality of qualities associated with the plurality of conditions, into one, in existence of the plurality of conditions in which settings of alterable items included in the conditions are identical, and to thereafter extract a condition with which the most excellent quality is associated, from among the conditions after the unifications and the conditions which were not identical in the settings of the alterable items to the other conditions.

According to the above configuration, the conditions whose alterable items have the identical settings are unified into one, in the database which holds the conditions and the qualities, whereupon the conditions are sorted with a key being the evaluation values (for example, defect percentages) of the product qualities of the static conditions, whereby the highest-order conditions among the alterable conditions can be determined as the optimal combination. That is, the conditions being optimal for a manufacturing plant can be obtained with note taken of the alterable conditions. It is accordingly permitted to set the optimal conditions for the manufacturing plant and to achieve the basic enhancement of the product quality.

Incidentally, the expression "to unify the plurality of conditions into one" signifies to substitute a plurality of conditions into one condition on the database. In the condition after the substitution, the same value as in the pertinent item before the substitution is set in the alterable item. Also, the mean value of qualities having been associated with the plurality of conditions before the substitution, or a typical value (such as the value of the worst quality) selected in accordance with a predetermined criterion is set in the condition after the unification.

Incidentally, the manufacture condition setting system may well be realized by a computer that executes computer readable program code. In this case, the invention covers within its category, a control program for a manufacture condition setting system as operates the computer as the respective means, thereby to realize the manufacture condition setting system by the computer, and a computer-readable record medium in which the control program is recorded.

As described above, a manufacture condition setting system according to the invention includes manufacture state acquisition means for acquiring static conditions that includes a plurality of items, and a dynamic condition corresponding to the static conditions; and experience accumulation means for accumulating the static conditions and the dynamic condition in an experience database in association with each other, when the number of manufactured articles manufactured in a state where the static conditions and the dynamic condition are constant is, at least, a predetermined number of manufactured articles, and besides, the static conditions and the dynamic condition do not change for, at least, a predetermined number of manufactured articles.

Further, a manufacture condition setting method according to the invention includes the steps of allowing manufacture state acquisition means of the manufacture condition setting system to acquire static conditions that includes a plurality of items and a dynamic condition corresponding to the static conditions; and allowing experience accumulation means of the manufacture condition setting system to accumulate the static conditions and the dynamic condition in an experience database in association with each other, when the number of manufactured articles manufactured in a state where the static conditions and the dynamic condition are constant is a predetermined number of manufactured articles, and besides, the static conditions and the dynamic condition do not change for, at least, a predetermined number of manufactured articles.

Accordingly, the dynamic condition corresponding to the static conditions can be acquired in an ordinary manufacture state so as to build the experience database. Advantageously, therefore, any special operation for building a knowledge database for estimating the manufacture condition setting of the dynamic condition of a new lot is not incurred, and it is permitted to start the service of a manufacture line early.

Also, a manufacture condition setting system according to the invention includes dynamic condition analogy means operating when any dynamic condition associated with a desired static condition to-be-estimated does not exist in a knowledge database in which one dynamic condition is held in association with one static condition, for selecting one item of a quantitative variable included in static conditions, for extracting static conditions as to which settings of all items with one item further excepted from the other items except one selected item are identical to those of the desired static condition, and for generating a dynamic condition corresponding to the desired static condition, on the basis of dynamic conditions associated with the extracted static conditions.

Also, a manufacture condition setting method according to the invention includes the step of allowing dynamic condition analogy means of the manufacture condition setting system to select one item of a quantitative variable included in static conditions, when any dynamic condition associated with a desired static condition to-be-estimated does not exist in a knowledge database in which one dynamic condition is held in association with one static condition, to extract static conditions as to which settings of all items with one item further excepted from the other items except one selected item are identical to those of the desired static condition, and to generate a dynamic condition corresponding to the desired static condition, on the basis of dynamic conditions associated with the extracted static conditions.

Therefore, the dynamic condition is generated by the procedure as stated above, whereby the dynamic condition can be generated even in a case where a qualitative variable whose sequence relation is not uniquely determined is included in the static condition. Advantageously, accordingly, the static conditions are freed from restrictions, and it is permitted to estimate the optimal dynamic condition.

Besides, a manufacture condition setting system according to the invention includes static condition correction means operating when contents of a plurality of dynamic conditions associated with a plurality of static conditions in which settings of only one item differ are substantially identical, in a knowledge database in which one dynamic condition is held in association with one static condition, for unifying the plurality of static conditions and dynamic conditions into one static condition and one dynamic condition, and for deleting the pertinent item from the static conditions.

Further, a manufacture condition setting method according to the invention includes the step of allowing static condition correction means of the manufacture condition setting system to unify a plurality of static conditions and a plurality of dynamic conditions into one static condition and one dynamic condition when contents of the plurality of dynamic conditions associated with the plurality of static conditions in which settings of only one item differ are substantially identical, in a knowledge database in which one dynamic condition is held in association with one static condition, and to delete the pertinent item from the static conditions.

Accordingly, the combinations of static conditions can be decreased to refine knowledge. Advantageously, therefore, the reliability of the knowledge can be enhanced even with a small number of experiences.

Besides, a manufacture condition setting system according to the invention includes static condition correction means operating when a plurality of dynamic conditions of substantially identical contents exist among a plurality of dynamic conditions associated with a plurality of static conditions in which settings of only one item differ, in a knowledge database in which one dynamic condition is held in association with one static condition, for unifying the plurality of dynamic conditions of substantially identical contents and the plurality of static conditions associated with the dynamic conditions, into one dynamic condition and one static condition, and for unifying the settings of the pertinent item of the plurality of static conditions into one setting.

Besides, a manufacture condition setting method according to the invention includes the step of allowing static condition correction means of the manufacture condition setting system to unify a plurality of dynamic conditions of substantially identical contents and a plurality of static conditions associated with the dynamic conditions, into one dynamic condition and one static condition, when the plurality of dynamic conditions of substantially identical contents exist among a plurality of dynamic conditions associated with a plurality of static conditions in which settings of only one item differ, in a knowledge database in which one dynamic condition is held in association with one static condition, and to also unify the settings of the pertinent item of the plurality of static conditions into one setting.

Accordingly, the combinations of static conditions can be decreased to refine knowledge. Therefore, the reliability of the knowledge can be enhanced even with a small number of experiences.

Besides, a manufacture condition setting system according to the invention includes condition inference means for reading out conditions and qualities from a database in which conditions including a plurality of items such as set values of a manufacturing equipment are held in association with qualities of manufactured articles manufactured under the conditions in the past, for comparing the read-out conditions, for unifying a plurality of conditions into one and also unifying a plurality of qualities associated with the plurality of conditions, into one, in existence of the plurality of conditions in which settings of alterable items included in the conditions are identical, and for thereafter extracting a condition with which the most excellent quality is associated, from among the conditions after the unifications and the conditions which were not identical in the settings of the alterable items to the other conditions.

Besides, a manufacture condition setting method according to the invention includes the step of allowing a condition inference means of the manufacture condition setting system to read out conditions and qualities from a database in which conditions including a plurality of items such as set values of a manufacturing equipment are held in association with qualities of manufactured articles manufactured under the conditions in the past, to compare the read-out conditions, to unify a plurality of conditions into one and also unify a plurality of qualities associated with the plurality of conditions, into one, in existence of the plurality of conditions in which settings of alterable items included in the conditions are identical, and to thereafter extract a condition with which the most excellent quality is associated, from among the conditions after the unifications and the conditions which were not identical in the settings of the alterable items to the other conditions.

Therefore, the optimal condition for a manufacturing plant can be obtained with note taken of the alterable conditions. Advantageously, accordingly, the basic enhancement of the product quality can be achieved by setting the optimal condition for the manufacturing plant.

BRIEF DESCRIPTION OF THE DRAWINGS

FIG. 2 is an explanatory diagram showing an example of an experience D/B which is included in the manufacture condition setting inference K/B of the manufacture condition setting system shown in FIG. 1;

FIG. 3 is an explanatory diagram showing an example of a knowledge D/B which is included in the manufacture condition setting inference K/B of the manufacture condition setting system shown in FIG. 1;

FIG. 6 is an explanatory diagram showing an example of a method of analogizing a dynamic condition in the dynamic condition analogy unit of the manufacture condition setting system shown in FIG. 1, in the case where a static condition is a quantitative variable;

FIGS. 7A and 7B are detailed explanatory diagrams of the example shown in FIG. 6, respectively;

FIG. 8 is an explanatory diagram showing an example of a method of analogizing a dynamic condition in the dynamic condition analogy unit of the manufacture condition setting system shown in FIG. 1, in the case where a static condition is a qualitative variable; and FIG. 9 is a detailed explanatory diagram of the example shown in FIG. 8.

DESCRIPTION OF THE PREFERRED EMBODIMENTS

Embodiments of the present invention will be described below with reference to FIG. 1 through FIG. 9.

Figure 1:
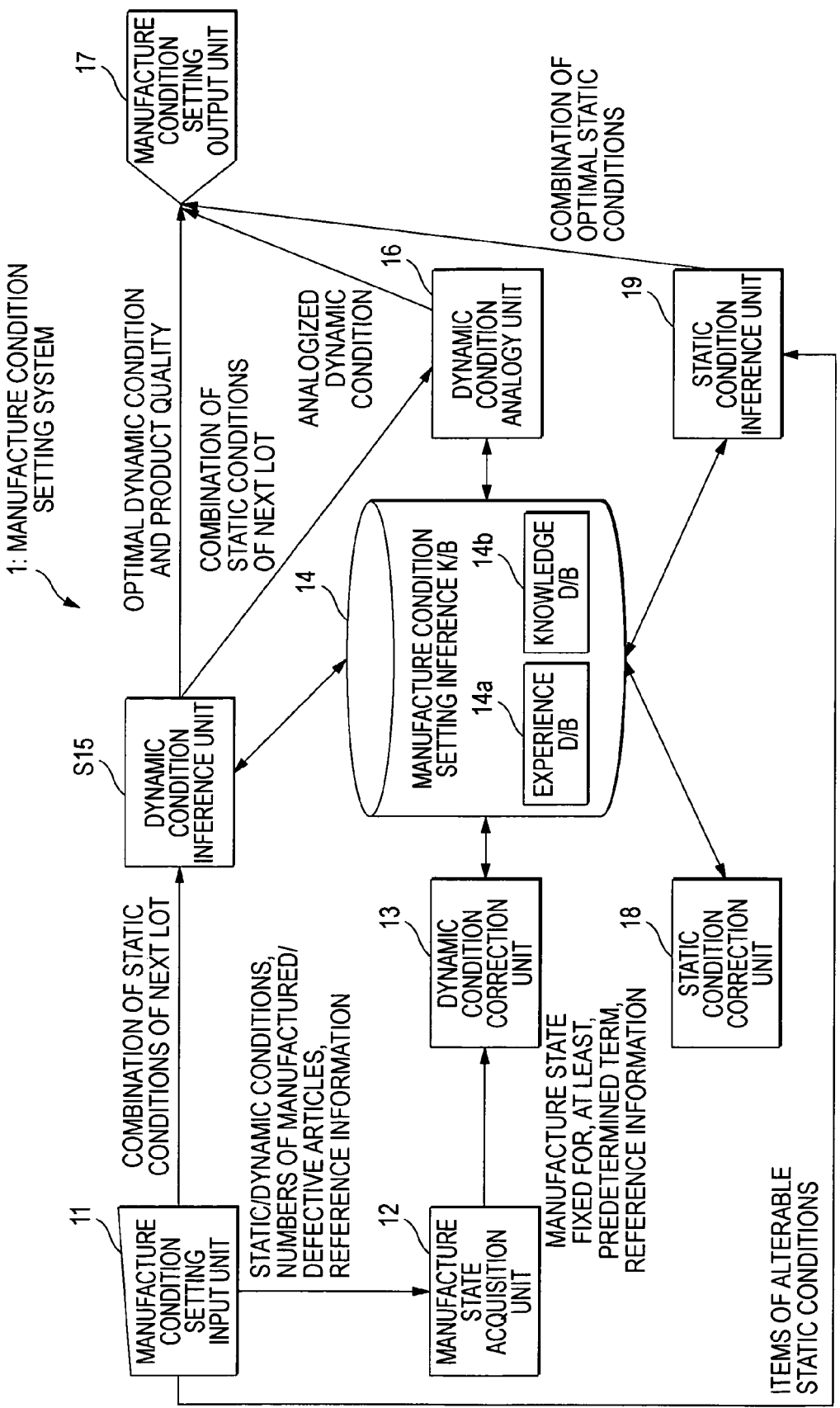
FIG. 1 is a functional block diagram showing the outline of the configuration of a manufacture condition setting system according to an embodiment of the present invention.

FIG. 1 is a functional block diagram showing the outline of the configuration of a manufacture condition setting system 1 according to an embodiment.

In order to assist the settings of manufacture conditions in a manufacturing site, the manufacture condition setting system 1 optimizes the set values of manufacturing equipments or the like dynamic conditions from the beginning of the point of time of the alterations of static conditions such as the kind of a product and the characteristics of parts. Concretely, the manufacture condition setting system 1 retrieves the combination of optimal static/dynamic conditions, by associating the corresponding relationships between the static conditions and dynamic conditions of the settings of the manufacture conditions, in accordance with manufacture qualities. Furthermore, it analogizes a dynamic condition optimal for inexperienced static conditions, and it deletes unnecessary/identical knowledge.

Here in this specification, a "lot" includes a plurality of manufactured articles. By the way, in each of the embodiments to be stated below, the manufactured articles shall be described as being countable as individuals. The invention, however, is also applicable to the manufacture of a continuous object such as wire material, or a material which is not individual, such as a liquid or air material. In that case, the "number of manufactured articles" and the "number of defective articles" in each embodiment shall be respectively changed to read as the "quantity of production" and a "defect percentage".

The static conditions and dynamic conditions are set for the manufacturing equipments for manufacturing the manufactured articles. The static conditions are conditions which hardly change throughout the lot, and which are given items basically. Many of the static conditions are unalterable ones (for example, a product model), but some of the static conditions are ones alterable by the alterations of the manufacturing methods of parts (for example, a molding die and a mean thickness). Hereinbelow, for the brevity of description, it is assumed that the static conditions are peculiar to the lot, and that they are not altered during the manufacture of the lot. In contrast, the dynamic conditions are the set conditions of the manufacturing equipments as are always alterable basically, in order to enhance a product quality. The dynamic conditions have their initial values set at the start of the manufacture of the lot, and are occasionally altered even during the manufacture of the lot.

Each of the static conditions and dynamic conditions contains one or more items. A quantitative variable whose set values have a sequence relation, or a qualitative variable whose set values do not have any sequence relation is set in each item. Incidentally, a numerical value, one or more values of the name of the kind of the product or the like, a model expression, etc. can be set as the set values.

The manufacture condition setting system 1 assists the operation of finding the optimal dynamic conditions for the static conditions of the lot. Therefore, the manufacture condition setting system 1 is well suited to the operation of initially setting the optimal dynamic conditions for the static conditions of a new lot at the start of the manufacture of the lot. In this case, it is the initial settings of the manufacture conditions that are presented by the manufacture condition setting system 1, and the dynamic conditions are altered from the initial settings of the manufacture conditions at need in the manufacturing site. Besides, the manufacture condition setting system 1 acquires the dynamic conditions altered in the manufacturing site, as a manufacture history, and it accumulates the altered dynamic conditions as experiences. Incidentally, although the case of estimating the initial settings of the new lot will be described below, it is needless to say that the manufacture condition setting system of the invention is utilizable also in the case of altering the manufacture conditions midway of the lot.

Also, the manufacture condition setting system 1 acquires the start date and hour and end date and hour of the manufacture, and the number of manufactured articles for every dynamic condition. Further, the manufacture condition setting system 1 acquires the evaluation value of the product quality, such as a defect percentage obtained at a test stage, for every dynamic condition. In addition, the manufacture condition setting system 1 accumulates the start date and hour and end date and hour of the manufacture, the number of manufactured articles and the evaluation value of the product quality as have been acquired every dynamic condition, in association with the static conditions and dynamic conditions.

Incidentally, what items are adopted as the static conditions, the dynamic conditions, the product quality and the retrieving condition can be appropriately selected in accordance with the manufactured articles, the manufacturing equipments, etc.

The manufacture condition setting system 1 builds knowledge for use in estimating the dynamic conditions, from experiences. The building of the knowledge from the experiences may be done at a predetermined timing such as the time when the experiences have been altered/deleted or the time when the static conditions have been refined, or it may well be done in compliance with the instruction of an operator.

Besides, it shall be termed "estimation" to determine the dynamic condition optimal for the static conditions of the new lot, in accordance with a knowledge base built of past manufacture histories at the start of the manufacture of the lot. Also, it shall be termed "inference" to determine the dynamic condition of a manufacture history as the dynamic condition of the new lot in a case where the manufacture history (experience) having the same static conditions as those of the new lot exists in the knowledge base. On the other hand, it shall be termed "analogy" to search for a manufacture history (experience) having similar static conditions and find the dynamic condition of the new lot on the basis of obtained manufacture conditions, in a case where the manufacture history (experience) having the same static conditions as those of the new lot does not exist in the knowledge base. That is, the "estimation" includes the "inference" in the case where the static conditions are experienced, and the "analogy" in the case where the static conditions are inexperienced.

Here will be described a manufacture condition setting inference K/B (Knowledge Database) 14 for use in the manufacture condition setting system 1, and the data structure thereof. FIG. 2 is an explanatory diagram showing an example of an experience D/B 14*a*. FIG. 3 is an explanatory diagram showing an example of a knowledge D/B 14*b*.

The manufacture condition setting inference K/B 14 is a knowledge base in which the static conditions 41 (the model of a product, the sort of a metal mold, the characteristic of a part, etc.) and dynamic conditions 42 (the set values, alteration magnitudes, etc. of manufacturing equipments) of the manufacturing site are stored in association with a manufacture quality 43 (a defect percentage, an error summation or the like) and reference information 44 (the dates/hours of the start and end of the manufacture, and the number of manufactured articles).

The manufacture condition setting inference K/B 14 is automatically built out of manufacture states experienced in the past. Concretely, the manufacture condition setting inference K/B 14 have its data automatically set and corrected by a dynamic condition correction unit 13 and a static condition correction unit 18. Also, the manufacture condition setting inference K/B 14 is referred to by a dynamic condition inference unit 15, a dynamic condition analogy unit 16 and a static condition inference unit 19.

The manufacture condition setting inference K/B 14 includes the experience D/B (experience database) 14*a* and the knowledge D/B (knowledge database) 14*b*.

It is common to the experience D/B 14*a* and the knowledge D/B 14*b* that the static conditions 41 and the dynamic conditions 42 are registered in association with the manufacture quality 43 and the reference information 44. Different is that, in the experience D/B 14*a*, even manufacture histories whose combinations of the static conditions are the same are repeatedly registered as different experiences, whereas in the knowledge D/B 14*b*, only one dynamic condition is registered for one combination of the static conditions. By the way, in the existence of a plurality of experiences having the same combinations of the static conditions, the experience of, for example, the lowest defect percentage is decided as affording the optimal condition and is registered as knowledge.

Figure 4:
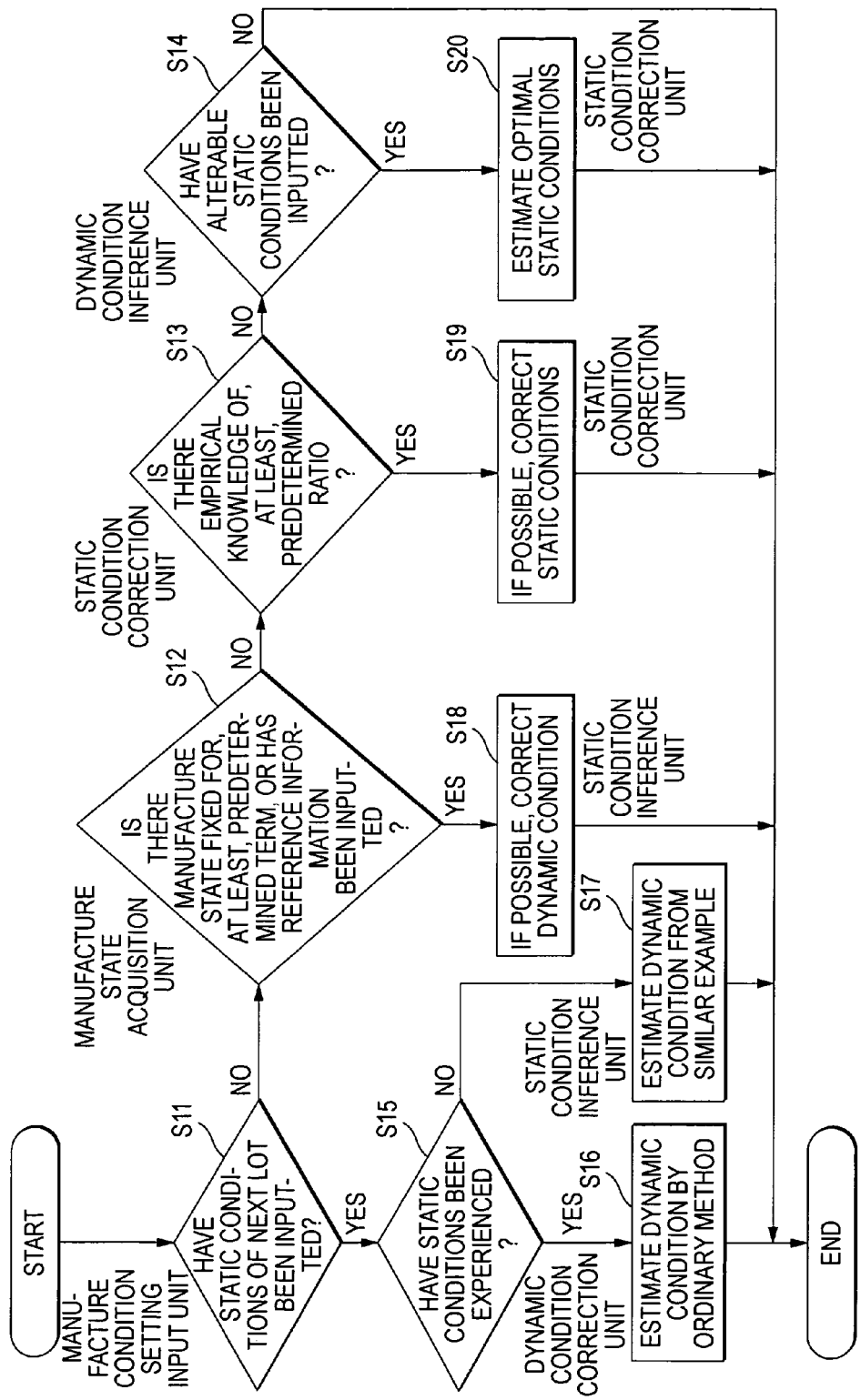
FIG. 4 is a flow chart showing the outline of the operation of the manufacture condition setting system shown in FIG. 1.

Next, the individual blocks of the manufacture condition setting system 1 will be described in detail with reference to FIGS. 1 and 4. FIG. 4 is a flow chart showing the outline of the operation of the manufacture condition setting system 1.

As shown in FIG. 1, the manufacture condition setting system 1 is configured including a manufacture condition setting input unit (manufacture condition setting input means) 11, a manufacture state acquisition unit (manufacture state acquisition means) 12, a dynamic condition correction unit (experience accumulation means, knowledge building means, and dynamic condition correction means) 13, the manufacture condition setting inference K/B (manufacture condition setting inference knowledge base) 14, the dynamic condition inference unit (dynamic condition inference means) 15, the dynamic condition analogy unit (dynamic condition analogy means) 16, a manufacture condition setting output unit (manufacture condition setting output means) 17, the static condition correction unit (static condition correction means) 18, and the static condition inference unit (static condition inference means) 19.

The manufacture condition setting input unit 11 is a device which inputs data necessary for the manufacture condition setting system 1, from outside. Mentioned as means for supplying the data are the management device of a manufacture line, an external database, the operator of the manufacture condition setting system 1, or the like. Here, in case of inputting the data from the management device of the manufacture line, the external database, or the like, the manufacture condition setting input unit 11 is a communication interface. Also, in a case where the operator inputs the data, the manufacture condition setting input unit 11 is a manipulation input device. Incidentally, the manufacture condition setting input unit 11 provides the user interface of the manufacture condition setting system 1 in cooperation with the manufacture condition setting output unit 17.

Concretely, in a case where the dynamic condition inference unit 15 or the dynamic condition analogy unit 16 estimates the optimal dynamic condition, the manufacture condition setting input unit 11 inputs the combination of the static conditions of the next lot ("Yes" at S11).

Further, the manufacture condition setting input unit 11 acquires the static conditions and dynamic conditions, and data such as the number of defective articles, the number of manufactured articles, and dimensional errors, as an ordinary manufacture state, so as to always output the acquired conditions and data to the manufacture state acquisition unit 12 ("No" at S11). Also, in a case where the dynamic condition correction unit 13 deletes any past experience from the inference knowledge, the manufacture condition setting input unit 11 designates the reference information 44 on that occasion and sets the information in the manufacture state correction unit 13 ("No" at S11, and S18).

Still further, in a case where the static condition inference unit 19 estimates the optimal static conditions, the manufacture condition setting input unit 11 designates the items of alterable static conditions (S14).

The manufacture state acquisition unit 12 first monitors the manufacture state inputted from the manufacture condition setting input unit 11 (S12). Subsequently, in the existence of a term for which the static conditions and the dynamic conditions do not fluctuate for, at least, a predetermined number of manufactured articles (threshold value), the manufacture state acquisition unit 12 calculates the product quality, and it outputs the calculated quality to the dynamic condition correction unit 13 and gives the instruction of adding a past experience (S18). Here, the threshold value of the number of manufactured articles is a value (overall index of an optimality) which is set in order to ensure the lower-limit reliability of the observations of the static conditions and the dynamic conditions. Regarding the product quality, the defect percentage which is the ratio of the number of defective articles to the number of manufactured articles, the error summation which is obtained by summing up dimensional errors, or the like can be utilized as the threshold value.

In a case where the manufacture state acquisition unit 12 has acquired a deletion instruction containing the reference information 44 (deletion condition), from the manufacture condition setting input unit 11, it directly outputs the acquired instruction to the dynamic condition correction unit 13, thereby to give the instruction of deleting the past experience which corresponds to the reference information 44 (S18). Here, as reasons for deleting the past experiences, there are mentioned a case where, after any experience was registered in the manufacture condition setting inference K/B 14, the drawback of the equipment in the past has been found, so the experience at the time of the registration has been revealed useless, a case where, since knowledge items have been enriched, a reliability is desired to be enhanced by heightening the threshold value of the number of manufactured articles in the manufacture state for use, and so forth. In case of altering the threshold value of the number of manufactured articles, however, the settings of the manufacture state acquisition unit 12 are simultaneously altered.

The dynamic condition correction unit 13 is activated in a case where the static/dynamic conditions and the product quality corresponding to, at least, the predetermined number of manufactured articles, or the reference information 44 has been inputted from the manufacture state acquisition unit 12.

In case of adding the past experience, the dynamic condition correction unit 13 reflects the static conditions, the dynamic conditions and the product quality, or the reference information inputted from the manufacture state acquisition unit 12, in the manufacture condition setting inference K/B 14 as an experienced manufacture history.

Here, in a case where the inputted static conditions are inexperienced, the dynamic conditions, product quality and reference information on that occasion are set as they are. In contrast, in a case where the inputted static conditions are experienced, the dynamic conditions and the product quality are overwritten only when the product quality is enhanced more than the existing one. However, in a case where the dynamic condition is in substantial agreement with the existing dynamic condition, the difference between the dynamic conditions is considered to be ascribable to an error factor, and hence, the mean value between the dynamic conditions may well be calculated and overwritten.

Also, in a case of deleting the past experience, the dynamic condition correction unit 13 deletes the experience corresponding to the reference information 44 contained in the deletion instruction, from the experience D/B 14*a*, and it thereafter rebuilds the knowledge D/B 14*b* out of the updated experience D/B 14*a*.

Further, upon confirming that experienced combinations have become, at least, a predetermined ratio among all the combinations of the static conditions, the dynamic condition correction unit 13 may well notify the operator that the analogy of manufacture condition settings by the dynamic condition analogy unit 16 is possible by employing the knowledge D/B 14*b*.

The dynamic condition inference unit 15 is activated in a case where the combination of the static conditions of the next lot as inputted from the manufacture condition setting input unit 11 is experienced ("Yes" at S15). On this occasion, when the inputted combination of the static conditions is the experienced one by reference to the manufacture condition setting inference K/B 14, the dynamic condition inference unit 15 outputs the optimal dynamic condition for the combination and the corresponding product quality to the manufacture condition setting output unit 17 (S16). On the other hand, when the inputted combination of the static conditions is inexperienced, the dynamic condition inference unit 15 outputs the inexperienced combination to the dynamic condition analogy unit 16, whereupon the operation is ended.

The dynamic condition analogy unit 16 is activated in a case where the combination of the static conditions as inputted to the dynamic condition inference unit 15 is inexperienced ("No" at S15), and it outputs the estimated dynamic condition to the manufacture condition setting output unit 17 (S17).

Here, as the method of estimating the dynamic condition, a condition as to which only one item differs in the inputted inexperienced combination of the static conditions is searched for from within the knowledge D/B 14*b*, and if the retrieval has failed, the mean of all the experienced combinations of the static conditions is calculated. Furthermore, if a plurality of experienced static conditions have been successfully retrieved, the experienced static conditions are narrowed down to similar examples, and the inexperienced static condition is calculated by a predetermined estimation method.

On this occasion, depending upon whether the different condition is a quantitative variable or a qualitative variable, whether or not the information of the sequence relation of the condition is usable differs, and hence, processing contents differ. Incidentally, the details of an analogy method for the inexperienced static condition will be described later.

The static condition correction unit 18 is activated in a case where experienced combinations have become, at least, a predetermined ratio (threshold value) among all the combinations of the static conditions, by reference to the knowledge D/B 14b ("Yes" at S13). Here, the threshold value of the predetermined ratio is a criterion for judging if information items necessary for making the static conditions intensive are complete, and it is set in order to avoid the execution of the intensification when the ratio of the experienced combinations is small.

The static condition correction unit 18 arranges so as to decrease the number of the items of the static conditions of the manufacture condition setting inference K/B 14 or the number of the set values of each of the items. Concretely, the static condition correction unit 18 first retrieves that item of any specified static condition as to which the dynamic condition and the product quality hardly change. If the retrieval is successful, the static condition correction unit 18 deletes the item of the specified static condition as an unnecessary item. Also, the static condition correction unit 18 retrieves the item of the static condition as contains a plurality of set values as to which the dynamic condition and the product quality substantially agree. If the retrieval is successful, the static condition correction unit 18 unifies the plurality of set values as that item of the static condition whose set values can be unified. Incidentally, a method of narrowing down the static conditions will be described later.

In a case where the static condition correction unit 18 has narrowed down the static conditions, the dynamic condition correction unit 13 updates the experience D/B 14a in conformity with the narrowed-down static conditions, and it rebuilds the knowledge D/B 14b out of the updated experience D/B 14a.

Owing to this processing, the items of the static conditions of the manufacture condition setting inference K/B 14 decreases, so that also the number of combinations decreases, and the inference knowledge can be refined with a smaller number of experiences.

The static condition inference unit 19 is activated in a case where the items of alterable static conditions have been inputted from the manufacture condition setting input unit 11 ("Yes" at S14) On this occasion, the static condition inference unit 19 divides the knowledge D/B 14b for the respective combinations of unalterable static conditions, whereupon it sorts the combinations in the descending order of product qualities, and it displays the highest-order alterable static condition and the corresponding product quality on the manufacture condition setting output unit 17. Here, this product quality is the upper-limit product quality at the time when the combination of the unalterable static conditions is fixed. Therefore, when the alterable static conditions are selected to set the optimal dynamic condition, the product quality can be enhanced more than by adjusting only the dynamic condition.

The manufacture condition setting output unit 17 is a device which outputs a processed result in the manufacture condition setting system 1. Mentioned as the output destination of the data is the management device of the manufacture line, an external database, the operator of the manufacture condition setting system 1, or the like. Here, in case of outputting the data to the management device of the manufacture line, the external database or the like, the manufacture condition setting output unit 17 is a communication interface. Further, in a case of presenting the data to the operator, the manufacture condition setting output unit 17 is a display device or a print device. Incidentally, the manufacture condition setting output unit 17 provides the user interface of the manufacture condition setting system 1 in cooperation with the manufacture condition setting input unit 11.

Concretely, in a case where the dynamic condition inference unit 15 or the dynamic condition analogy unit 16 has estimated the optimal dynamic condition, the manufacture condition setting output unit 17 displays the dynamic condition being the inferred result, and if possible, the corresponding product quality, to the operator. Alternatively, the manufacture condition setting output unit 17 automatically sets the dynamic condition being the inferred result, in the respective manufacture equipments whose dynamic conditions are to be altered (S16, S17).

In a case where the static condition inference unit 19 has estimated the optimal static conditions, the manufacture condition setting output unit 17 outputs the combination of the static conditions being the inferred results (S20).

As described above, the manufacture condition setting system 1 has the four principal functions ([A] building the inference knowledge, [B] analogizing the dynamic condition, [C] narrowing down the static conditions, and [D] retrieving the optimal static condition). Now, the four functions will be described in detail. Incidentally, the manufacture condition setting system 1 need not be provided with all the functions, that is, all the functional blocks shown in FIG. 1, in a single apparatus, but it can also be configured so that distributed processes are executed by a plurality of processes. It is also possible to configure an apparatus which has only some of the four functions [A]-[D].

[A] Building of Inference knowledge

The manufacture condition setting system 1 is configured especially as stated below, in order to build inference knowledge.

The manufacture state acquisition unit (manufacture state acquisition means) 12 acquires a static condition that includes a plurality of items, and a dynamic condition corresponding to the static condition, from the manufacture condition setting input unit 11. When the number of manufactured articles which have been manufactured in a state where the static condition and the dynamic condition are constant is, at least, a predetermined number, that is, when the static condition and the dynamic condition do not change for, at least, the predetermined number of manufactured articles, the dynamic condition correction unit (experience accumulation means) 13 accumulates the pertinent static condition and the pertinent dynamic condition in the experience D/B 14a in association with each other.

Also, when a plurality of dynamic conditions of different contents are accumulated in association with static conditions of identical content, in the experience D/B 14a, the dynamic condition correction unit (knowledge building means) 13 which registers the static condition and the dynamic condition from the experience D/B 14a in the knowledge D/B 14b where one dynamic condition is held in association with one static condition selects one dynamic condition to be registered in the knowledge D/B 14b, from the plurality of dynamic conditions, or it generates one dynamic condition to be registered, on the basis of the plurality of dynamic conditions. Here, in determining one dynamic condition to be made knowledge, the dynamic condition correction unit 13 may select one of the dynamic conditions of a plurality of experiences on the basis of a manufacture quality (such as defective percentage), and it may well obtain one dynamic condition by a calculation, for example, averaging the dynamic conditions of a plurality of experiences.

Furthermore, in accumulating the static condition and the dynamic condition in the experience D/B 14*a* in association with each other, the dynamic condition correction unit (experience accumulation means) 13 accumulates these conditions in the experience D/B 14*a* by further associating reference information for retrieving them.

Also, in correcting stored inference knowledge, the dynamic condition correction unit 13 reports the startability of a service to the operator through the manufacture condition setting output unit 17 when the ratio of the stored combinations of static conditions has become, at least, a predetermined ratio.

As shown in FIG. 2, when the static conditions and the dynamic conditions have not changed for, at least, a predetermined number of manufactured articles (for example, 1000 articles), the dynamic condition correction unit 13 simply (also repeatedly) accumulates in the experience D/B 14*a*, the experienced static conditions 41, dynamic conditions 42, defect percentage 43 (product quality) and reference information 44 inputted from the manufacture state acquisition unit 12. On this occasion, the dynamic condition correction unit 13 associates the dates and hours of the start/end of the manufacture and the number of the manufactured articles as the reference information 44, whereby the past experience can be easily selected later.

As shown in FIG. 3, the dynamic condition correction unit 13 evaluates the dynamic conditions 42 registered in the experience D/B 14*a*, in terms of the defect percentage 43, and it registers the dynamic conditions of the least defect percentage 43 in the knowledge D/B 14*b* as the optimal conditions, together with the information of the static conditions, etc. That is, in a case where a plurality of experiences exist for one combination of static conditions, the dynamic condition correction unit 13 sets the static conditions of the experience of the highest product quality as they are. However, this is not restrictive, but the dynamic condition correction unit 13 may well approximate the dynamic conditions into a function whose input is the dynamic condition and whose output is the product quality, by utilizing a response curved surface method or the like, and thereafter set the estimated results of the dynamic conditions of the highest product quality.

Figure 5:
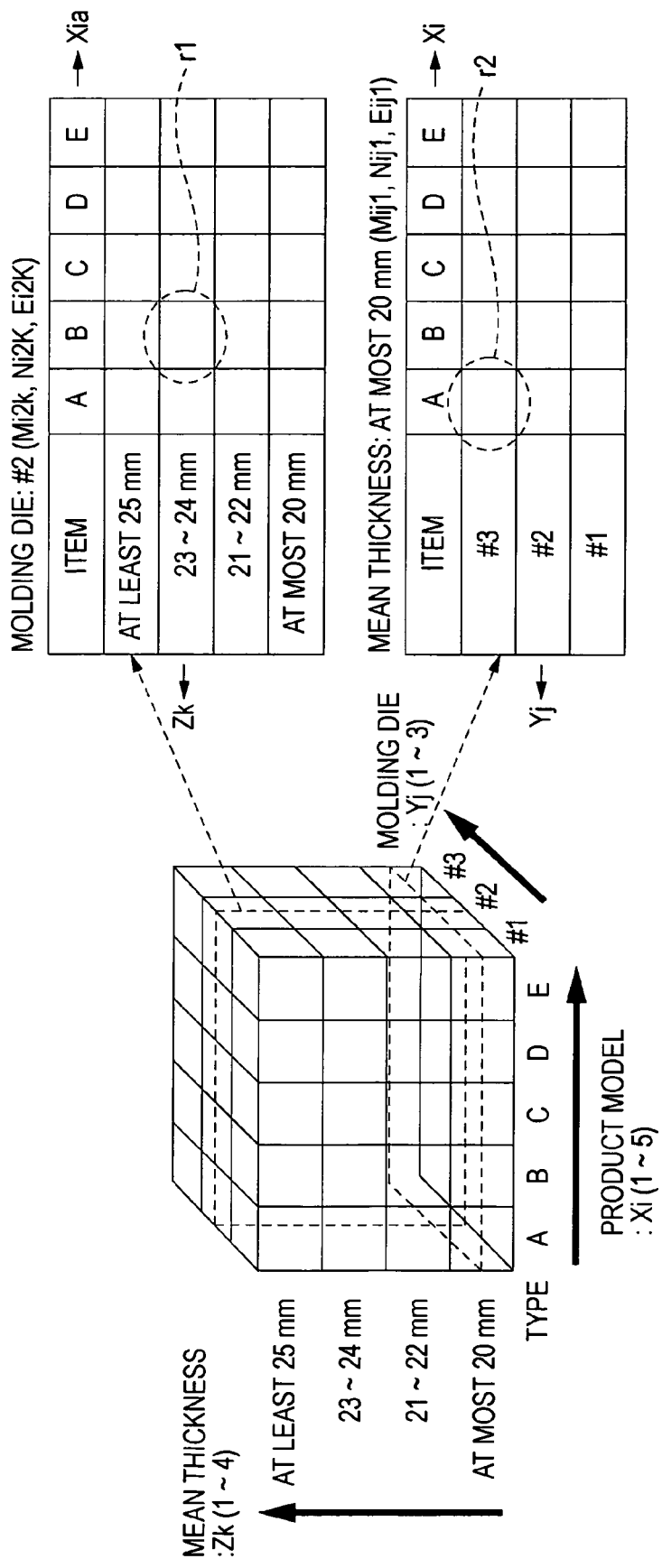
FIG. 5 is an explanatory diagram showing the structure of the knowledge D/B shown in FIG. 3, in model-like fashion.

Here, FIG. 5 is an explanatory diagram showing the structure of the knowledge D/B 14*b* in model-like fashion. By the way, in FIG. 5, the structure becomes a three-dimensional table because of three items of static conditions, and some planes (a molding die #2, and a mean thickness of at most 20 mm) are extracted and shown for the brevity of description. However, the planes are merely for illustration, and data need not be managed in the illustrated aspect.

When the example of FIG. 2 is decomposed into all the combinations of static conditions, FIG. 5 is obtained. Cubic cells in FIG. 5 correspond to the combinations of static conditions, and one dynamic condition is registered in each of the cubic cells. When the dynamic condition is registered in the cell, it is meant that the pertinent combination of static conditions is experienced, and when not, it is meant that the pertinent combination is inexperienced.

Incidentally, for the purpose of tabulation, in a case where the static condition has a quantitative variable, it is discretized and then subjected to a condition division. It is also allowed, however, to store the static conditions in a form approximated to a function whose inputs are the dynamic condition and the static condition of the quantitative variable and whose output is the product quality, by utilizing the response curved surface method or the like, and to dynamically optimize the dynamic condition at the time of an inference after the static conditions have been fixed.

As described above, the manufacture condition setting system 1 first acquires static/dynamic conditions and a product quality in the case where the static/dynamic conditions do not change for, at least, a predetermined number of manufactured articles in an ordinary manufacture state, and it compares the manufacture qualities and corrects the values of the dynamic conditions and prediction expressions, so as to accumulate the inference knowledge of the optimal dynamic conditions in the knowledge D/B 14*b*. Incidentally, when the inference knowledge items have been accumulated to a certain degree, a service for setting manufacture conditions as based on the inference knowledge items can be started.

Also, if any of the manufacture states acquired in the past is to be deleted, a corresponding manufacture history (the combination of the static conditions, the dynamic conditions, the product quality and reference information) is retrieved from within the experience D/B 14*a* retaining experiences, by the reference information 44, and it is deleted. Thereafter, the inference knowledge of the dynamic conditions (knowledge D/B 14*b*) is rebuilt from the beginning.

Thus, the knowledge of the dynamic condition for the combination of the static conditions can be acquired in the ordinary manufacture state. Therefore, any special operation for building the inference knowledge conforming to a manufacture line is not incurred, and it is permitted to start the service of the manufacture line early.

Furthermore, the past experiences and the knowledge items of the dynamic conditions are dividedly held. Therefore, even when any drawback has been found later, any of the past experiences can be easily deleted from the knowledge, and the degeneration of the building of the inference knowledge does not occur.

[B] Analogy of Dynamic condition

In order to analogize a dynamic condition, the manufacture condition setting system 1 is configured especially as stated below.

In a case where a dynamic condition to-be-estimated associated with a static condition does not exist in the knowledge D/B 14*b* in which one dynamic condition is held in association with one static condition, the dynamic condition analogy unit (dynamic condition analogy means) 16 selects one item formed of a quantitative variable as contained in the static condition, it extracts static conditions which are the same as the pertinent static condition in the settings of all items with one further item excepted from the other items except one selected item, and it generates the dynamic condition which corresponds to the pertinent static condition, on the basis of dynamic conditions associated with the extracted static conditions.

In a case of retrieving similar examples of inexperienced static conditions, the dynamic condition analogy unit 16 may well alter a calculation method, between a quantitative variable and a qualitative variable which are the attributes of the static conditions. Also, in the case of retrieving the similar examples of the inexperienced static conditions, the dynamic condition analogy unit 16 may well prefer the similar examples of the quantitative variable to those of the qualitative variable as regards the attributes of the static conditions.

Methods of analogizing the dynamic conditions will be respectively described as to a case where the static condition is the quantitative variable and a case where it is the qualitative variable, with reference to FIG. 6-FIG. 9.

(1) Quantitative Variable

FIG. 6 is an explanatory diagram showing an example of the method of analogizing the dynamic condition in the dynamic condition analogy unit 16, in the case where the static condition is the quantitative variable. FIGS. 7A and 7B are detailed explanatory diagrams of the example shown in FIG. 6, respectively.

In the existence of experienced combinations in each of which only one item of the static condition being the quantitative variable differs, the combinations whose item sequences are the nearest are selected as the similar examples by utilizing the fact that a sequence relation is definite, the optimal dynamic condition and the corresponding product quality are calculated by proportional allocations (FIG. 7A). Here, in a case where the experienced combinations of the static conditions exist on both the front and rear sides, an interpolative computation is directly used.

On the other hand, an extrapolative computation is generally inferior in the precision of estimation to the interpolative computation. Therefore, in a case where the experienced combination of the static conditions exists on only one side, the nearest value is directly used (FIG. 7B).

(2) Qualitative Variable

FIG. 8 is an explanatory diagram showing an example of the method of analogizing the dynamic condition in the dynamic condition analogy unit 16, in the case where the static condition is the qualitative variable. FIG. 9 is a detailed explanatory diagram of the example shown in FIG. 8.

In the existence of only experienced combinations in each of which only one item of the static condition being the qualitative variable differs, a sequence relation is indefinite, and hence, the combinations whose item sequences are the nearest cannot be selected as the similar examples as in the case of the quantitative variable.

Therefore, in a case where different experienced static conditions exist in the shape of a rectangle as in the case of β1 in FIG. 8, three combinations of small gradients are selected as the similar examples, and the optimal dynamic condition is relatively calculated from variations (FIG. 9). Incidentally, since individual dynamic conditions need to be separately analogized, the product quality of the optimal dynamic condition cannot be calculated and is not outputted.

In contrast, in a case where different experienced static conditions do not exist in a rectangular shape as in the case of β2 in FIG. 8, all the static conditions in each of which only one item differs are selected as the similar examples, and the mean values of these static conditions are calculated as the optimal dynamic condition and the corresponding product quality. Incidentally, in a case where (E, #1) is experienced, its value is also added for the computation of β2.

Since, however, the quantitative variable is expected to be higher in the precision of estimation than the qualitative variable in correspondence with the clear sequence relation, the quantitative variable should better be preferred in the selection of the similar examples.

As described above, with the manufacture condition setting system 1, when the inexperienced combination of static conditions has occurred in setting manufacture conditions on the basis of inference knowledge, similar examples are retrieved from proportional allocations in case of a quantitative variable or from gradients or the likes in case of a qualitative variable, and an optimal dynamic condition is estimated from variations or the likes from the similar examples.

Thus, even in the existence of any inexperienced static condition containing the qualitative variable whose sequence relation is not uniquely determined, the optimal dynamic condition can be estimated, so that the static conditions are freed from restrictions, and a more optimal dynamic condition can be outputted.

[C] Narrowing-Down of Static Conditions

In order to narrow down static conditions, the manufacture condition setting system 1 is configured especially as stated below.

In a case where the contents of a plurality of dynamic conditions associated with a plurality of static conditions in which the setting of only one item differs are substantially identical in a knowledge database in which one dynamic condition is held in association with one static condition, the static condition correction unit (static condition correction means) 18 unifies the plurality of static conditions and dynamic conditions into one static condition and one dynamic condition, and it deletes the pertinent item from the static conditions. That is, the static condition correction unit 18 deletes the static condition as to which the dynamic condition and a product quality hardly change, as unnecessary knowledge. Concretely, in FIG. 3, the "mean thickness" is deleted from the static condition.

Also, in a case where a plurality of dynamic conditions of substantially identical contents exist among a plurality of dynamic conditions associated with a plurality of static conditions in which the setting of only one item differs, in a knowledge database in which one dynamic condition is held in association with one static condition, the static condition correction unit (static condition correction means) 18 unifies the plurality of dynamic conditions of the substantially identical contents and the plurality of static conditions associated with these dynamic conditions, into one dynamic condition and one static condition, and it unifies the settings of the item in the plurality of static conditions, into one. That is, the static condition correction unit 18 unifies the plurality of static conditions as to which the dynamic conditions are in substantial agreement, as identical knowledge. Concretely, in FIG. 6, "21-22 mm" and "at most 20 mm" in the "mean thickness" are put together into "at most 22 mm".

Incidentally, it may well be set as a knowledge deleting condition that, in addition to the dynamic conditions, product qualities hardly change. Further, it is desirable to set as a condition that the ratio of experienced combinations to all the combinations of static conditions is, at least, a predetermined value. This is intended to ensure a reliability.

Also, after the static condition correction unit 18 has narrowed down the static variables, the dynamic condition correction unit 13 corrects the experience D/B 14a and rebuilds the knowledge D/B 14b out of the corrected experience D/B 14a.

According to the above configuration, when knowledge items have been enriched, static conditions as to which dynamic conditions do not change are deleted as unnecessary knowledge, and a plurality of static conditions as to which dynamic conditions agree are unified as identical knowledge, whereby the combinations of static conditions are decreased to refine knowledge.

Thus, the knowledge can be refined by deleting the unnecessary knowledge items and unifying the identical knowledge items, so that the combinations of the static conditions can be decreased, and the reliability of the knowledge can be enhanced in a short term even with a small number of experiences.

[D] Retrieval of Optimal Static Condition

In order to retrieve optimal static conditions, the manufacture condition setting system 1 is configured especially as stated below.

The static condition inference unit (condition inference means) 19 retrieves the static conditions associated with the most excellent product quality, from the knowledge D/B (database) 14b. On this occasion, the static condition inference unit 19 does not consider dynamic conditions. Concretely, in the case of FIG. 3, the static conditions (Type A, #1, and 18 mm) of the least defect percentage are extracted.

Further, the static condition inference unit 19 reads out the static conditions 41 and the product qualities 43 from the knowledge D/B 14b, and it compares the static conditions 41. Here, in the existence of the plurality of static conditions 41 in which the settings of alterable items contained are identical, the static condition inference unit 19 unifies the plurality of static conditions 41 into one and also unifies the plurality of product qualities 43 associated with these static conditions 41, into one. Thereafter, the static condition with which the most excellent product quality 43 is associated is extracted from the unified static condition and conditions which were not identical to the other static conditions 41 in the settings of the alterable items.

Here, the expression "to unify the plurality of static conditions into one" signifies to substitute a plurality of knowledge items into one knowledge item. In the knowledge item after the substitution, the same values as in the knowledge item before the substitution are set in the alterable items of the static condition (for example, the molding die and the mean thickness). Further, all values having been respectively set in the plurality of knowledge items before the substitution, for example, may well be listed in the unalterable items of the static condition. Also, the mean value of values having been set in the plurality of knowledge items before the substitution, or a typical value (such as the value of the worst quality) selected in accordance with a predetermined criterion is set as the product quality.

Incidentally, since the dynamic conditions are not used in this processing, it is favorable to generate a new database in which the dynamic conditions 42 removed from the knowledge D/B 14b (FIG. 3), and to perform editing for the new database.

By the way, whether or not the item of each static condition is alterable may be preset every item in the static condition inference unit 19 or the knowledge D/B 14b, or it may well be inputted through the manufacture condition setting input unit 11 by the operator when he/she performs the above processing.

Also, after having unified the product qualities in the combinations of the alterable static conditions, the static condition inference unit 19 may well display a list (static condition list) in which the product qualities as a key are sorted in the order of excellent ones (the defect percentages are sorted in the order of smaller ones). Here, the expression "to unify the product qualities in the combinations of the alterable static conditions" concretely signifies, for example, to average the product qualities of unalterable static conditions in the combinations of alterable static conditions.

According to the above configuration, when the knowledge items of optimal dynamic conditions for the combinations of static conditions have been acquired in a sufficient number, they are sorted with a key being the evaluation values (for example, defect percentages) of the product qualities of the static conditions, whereby the highest-order static conditions among the alterable static conditions can be determined as the optimal combination. That is, the static conditions being optimal for a manufacturing plant can be obtained with note taken of the alterable static conditions. Therefore, the optimal conditions for the manufacturing plant can be selected, not only for the dynamic conditions, but also for the alterable static conditions, whereby the basic enhancement of the product quality can be achieved.

The present invention is not restricted to the embodiment described above, but it is capable of various alterations within a scope defined in the appended claims. That is, those aspects of performance which are obtained by combining technical means appropriately altered within the scope defined in the claims shall be covered within the technical scope of the invention. By way of example, the invention can be configured as stated below.

The manufacture condition setting system of the invention may well be configured including a dynamic condition inference unit which estimates and outputs a corresponding optimal dynamic condition in a case where the current combination of static conditions is an experienced one, a manufacture state acquisition unit which acquires static/dynamic conditions and a product quality in the case where the static/dynamic conditions do not change for, at least, a predetermined number of manufactured articles, in an ordinary manufacture state, or which inputs a condition for deleting any of past manufacture states under predetermined conditions later, and a dynamic condition correction unit which, if necessary, corrects inference knowledge stored by the dynamic condition estimation unit, by using information inputted from the manufacture state acquisition unit.

Further, in the above configuration, the manufacture condition setting system of the invention may well include a manufacture condition setting inference K/B which holds knowledge items for estimating optimal dynamic conditions, and which is configured so as to dividedly hold a portion for storing the histories of past manufacture states therein, and an inference portion for storing optimal dynamic conditions therein.

Further, in the above configuration, the manufacture condition setting system of the invention may well be so configured that the manufacture condition setting inference K/B is capable of retrieving any specified manufacture state later by affixing reference information (for example, time stamps) to the histories of the past manufacture states.

Further, in the above configuration, the manufacture condition setting system of the invention may well include a dynamic condition correction unit which builds knowledge items for estimating optimal dynamic conditions, and which is configured so as to be capable of re-executing from the beginning, a process that builds an inference portion for storing optimal dynamic conditions therein, out of the histories of the past manufacture states.

Further, in the above configuration, the manufacture condition setting system of the invention may well be so configured that, in a case where the dynamic condition correction unit is to correct the stored inference knowledge, it notifies the startability of a service when the ratio of the stored combinations of the static conditions has become, at least, a predetermined ratio.

According to the above configuration, first of all, there are acquired the static/dynamic conditions and the product qualities in the case where the static/dynamic conditions do not change for, at least, the predetermined number of manufactured articles in the ordinary manufacture state, the manufacture qualities are compared, and the values of the dynamic conditions and prediction expressions are corrected, so as to accumulate the inference knowledge items of the optimal dynamic conditions. When the inference knowledge items have been accumulated to a certain degree, the service for setting manufacture conditions as based on the inference knowledge items is started.

Also, if any of the manufacture state acquired in the past is to be deleted later, a corresponding manufacture state is retrieved from an experience list having been retained, by the reference information, the retrieved manufacture state is deleted, and the inference knowledge of the dynamic conditions is rebuilt from the beginning.

Thus, the knowledge of the dynamic condition for the combination of the static conditions can be acquired in the ordinary manufacture state, so that any special operation for building the inference knowledge conforming to a manufacture line is not incurred, and it is permitted to start the service of the manufacture line early.

Further, the past experiences and the knowledge items of the dynamic conditions are dividedly held, so that even when any drawback has been found later, any of the past experiences can be easily deleted from the knowledge, and the degeneration of the building of the inference knowledge does not occur.

The manufacture condition setting system of the invention may well be configured including a dynamic condition inference unit which estimates and outputs a corresponding optimal dynamic condition in a case where the current combination of static conditions is an experienced one, and a dynamic condition analogy unit which retrieves similar examples from the experienced combinations of static conditions and then predicts an optimal dynamic condition in a case where the current combination of static conditions is an inexperienced one.

Further, in the above configuration, the manufacture condition setting system of the invention may well be so configured that the dynamic condition analogy unit alters a calculation method, between a quantitative variable and a qualitative variable which are the attributes of the static conditions, in retrieving the similar examples of the inexperienced static conditions.

Further, in the above configuration, the manufacture condition setting system of the invention may well be so configured that the dynamic condition analogy unit prefers the similar examples of the quantitative variable to those of the qualitative variable as regards the attributes of the static conditions, in retrieving the similar examples of the inexperienced static conditions.

According to the above configuration, in a case where the inexperienced combination of static conditions has occurred in setting manufacture conditions on the basis of inference knowledge, similar examples are retrieved from proportional allocations in case of a quantitative variable or from gradients or the likes in case of a qualitative variable, and an optimal dynamic condition is estimated from variations or the likes from the examples.

Thus, even in the existence of any inexperienced static condition containing the qualitative variable whose sequence relation is not uniquely determined, the optimal dynamic condition can be estimated, so that the static conditions are freed from restrictions, and a more optimal dynamic condition can be outputted.

The manufacture condition setting system of the invention may well be configured including a dynamic condition inference unit which estimates and outputs a corresponding optimal dynamic condition in a case where the current combination of static conditions is an experienced one, and a static condition correction unit which, if possible, decreases the combinations of the static conditions of inference knowledge as are stored in the dynamic condition inference unit.

Further, in the above configuration, the manufacture condition setting system of the invention may well be so configured that, when the static condition correction unit is to decrease the combinations of the static conditions, it is conditioned that the ratio of the experienced combinations of the static conditions is, at least, a predetermined ratio.

Further, in the above configuration, the manufacture condition setting system of the invention may well be so configured that, when the static condition correction unit is to decrease the combinations of the static conditions, the static conditions as to which dynamic conditions and product qualities hardly change are deleted as unnecessary knowledge.

Further, in the above configuration, the manufacture condition setting system of the invention may well be so configured that, when the static condition correction unit is to decrease the combinations of the static conditions, a plurality of static conditions as to which dynamic conditions and product qualities are in substantial agreement are unified as identical knowledge.

According to the above configuration, when knowledge items have been enriched, static conditions as to which dynamic conditions do not change are deleted as unnecessary knowledge, and a plurality of static conditions as to which dynamic conditions agree are unified as identical knowledge, whereby the combinations of static conditions are decreased to refine knowledge.

Thus, the knowledge can be refined by deleting the unnecessary knowledge items and unifying the identical knowledge items, so that the combinations of the static conditions can be decreased, and the reliability of the knowledge can be enhanced in a short term even with a small number of experiences.

The manufacture condition setting system of the invention may well be configured including a dynamic condition inference unit which estimates and outputs a corresponding optimal dynamic condition in a case where the current combination of static conditions is an experienced one, and a static condition inference unit which retrieves and outputs the optimal combination of static conditions without considering dynamic conditions.

Further, in the above configuration, the manufacture condition setting system of the invention may well be so configured that, when the static condition inference unit is to retrieve the combination of static conditions, it selects the combination of optimal product quality among the selectable combinations of static conditions.

According to the above configuration, when the knowledge items of optimal dynamic conditions for the combinations of static conditions have been acquired in a sufficient number, they are sorted with a key being the product qualities of the static conditions, whereby the highest-order static conditions among the alterable static conditions can be determined as the optimal combination and reflected on future static conditions.

Thus, the optimal combination of the static conditions can be retrieved by sorting the knowledge items with a key being the evaluation values (for example, defect percentages) of the product qualities of the static conditions, so that the basic enhancement of the product quality can be achieved by selecting, not only the dynamic conditions, but also the alterable static conditions.

Lastly, the individual blocks of the manufacture condition setting system 1, especially the manufacture state acquisition unit 12, dynamic condition correction unit 13, dynamic condition inference unit 15, dynamic condition analogy unit 16, static condition correction unit 18 and static condition inference unit 19 may be configured by hardware logics, or they may well be realized by software by employing a CPU as stated below. By the way, in case of realizing the blocks by the software, the manufacture condition setting system 1 can be configured on the basis of a workstation or a general-purpose computer such as personal computer.

More specifically, the manufacture condition setting system 1 includes the CPU (central processing unit) which executes the instructions of a control program as incarnate individual functions, a ROM (read only memory) which stores the programs therein, a RAM (random access memory) which expands the programs, a memory or the like storage device (record medium) which stores the programs and various data therein, and so forth. Further, an object of the invention can also be accomplished in such a way that a record medium in which the program codes (execution format program, intermediate code program, and source program) of the control program of the manufacture condition setting system 1 being the software for incarnating the foregoing functions are recorded so as to be readable by a computer is supplied to the manufacture condition setting system 1, and that the computer (or a CPU or MPU) reads out and executes the program codes recorded in the record medium.

Usable as the record medium is, for example, tape means such as a magnetic tape or cassette tape, disk means including a magnetic disk such as a Floppy (registered trademark) disk or hard disk or an optical disk such as CD-ROM, MO, MD, DVD or CD-R, card means such as an IC card (including a memory card) or optical card, or semiconductor memory means such as a mask ROM, EPROM, EEPROM or flash ROM.

Also, it is also allowed to configure the manufacture condition setting system 1 so as to be connectable with a communication network, and to supply the program codes through the communication network. The communication network is not especially restricted, but it may well be, for example, the Internet, an intranet, an extranet, a LAN, an ISDN, a VAN, a CATV communication network, a virtual private network, a telephone line network, a mobile communication network, or a satellite communication network. Also, a transmission medium which constitutes the communication network is not especially restricted, but it may well be, for example, wire means such as IEEE 1394, USB, power line conveyance, a cable TV line, a telephone line or an ADSL line, or radio means such as infrared radiation in an IrDA, a remote controller or the like, the Bluetooth (registered trademark), the 802.11 radio, an HDR, a portable telephone network, a satellite channel or a ground-wave digital network. Incidentally, the invention can also be realized in the form of computer data signals which are buried in carrier waves and in which the program codes are incarnated by electronic transmission.

The present invention is extensively applicable to uses for estimating a dynamic condition such as the set value of a manufacturing equipment. Especially, it is well suited for the manufacture condition setting apparatus of an automated manufacturing plant or manufacture line in which few people are concerned.

The invention clamed is:

1. A manufacture condition setting system which assists an estimation of a dynamic condition that corresponds to a set value of a manufacturing equipment, comprising:
    manufacture state acquisition means for acquiring static conditions that include a plurality of items, and a dynamic condition corresponding to the static conditions; and
    experience accumulation means for accumulating the static conditions and the dynamic condition in an experience database in association with each other, when the number of manufactured articles manufactured are more than a predetermined number, and are manufactured in a state where the static conditions and the dynamic condition are constant
    the static conditions are conditions which are not altered during manufacture of a lot, and the dynamic condition is a condition which is at least one set condition of manufacturing equipment and which is alterable during the manufacture of the lot in order to enhance a product quality, and
    wherein the lot corresponds to a plurality of the manufactured articles.

2. A manufacture condition setting system as defined in claim 1, further comprising:
    knowledge building means for registering static conditions and dynamic conditions from the experience database, in a knowledge database in which one dynamic condition is held in association with one static condition;
    wherein when a plurality of dynamic conditions of different contents are accumulated in association with static conditions of identical contents, in the experience database, said knowledge building means selects one dynamic condition to be registered in the knowledge database, from the plurality of dynamic conditions, or it generates one dynamic condition to be registered in the knowledge database, on the basis of the plurality of dynamic conditions.

3. A manufacture condition setting system as defined in claim 1, wherein in accumulating the static conditions and the dynamic condition in the experience database in association with each other, said experience accumulation means accumulates the static conditions and the dynamic condition in the experience database by further associating reference information for retrieving them.

4. A manufacture condition setting method in a manufacture condition setting system which assists an estimation of a dynamic condition that corresponds to a set value of a manufacturing equipment, comprising the steps of:
    allowing manufacture state acquisition means of the manufacture condition setting system to acquire static conditions that include a plurality of items and a dynamic condition corresponding to the static conditions; and
    allowing experience accumulation means of the manufacture condition setting system to accumulate the static conditions and the dynamic condition in an experience database in association with each other, when the number of manufactured articles manufactured are more than a predetermined number, and are manufactured in a state where the static conditions and the dynamic condition are constant,
    the static conditions are conditions which are not altered during manufacture of a lot, and the dynamic condition is a condition which is at least one set condition of manufacturing equipment and which is alterable during the manufacture of the lot in order to enhance a product quality, and
    wherein the lot corresponds to a plurality of the manufactured articles.

5. A manufacture condition setting method as defined in claim 4, further comprising:
    registering static conditions and dynamic conditions from the experience database, in a knowledge database in which one dynamic condition is held in association with one static condition;

accumulating a plurality of dynamic conditions of different contents in association with static conditions of identical contents, in the experience database; and selecting one dynamic condition to be registered in the knowledge database, from the plurality of dynamic conditions, or it generates one dynamic condition to be registered in the knowledge database, on the basis of the plurality of dynamic conditions.

\* \* \* \* \*